US012688143B2

(12) United States Patent \
Ji et al.

(10) Patent No.: US 12,688,143 B2 \
(45) Date of Patent: Jul. 21, 2026

(54) ELECTRONIC DEVICE MANAGING COMPUTING POWERS OF PERIPHERAL ELECTRONIC DEVICES AND OPERATING METHOD OF ELECTRONIC DEVICE

(71) Applicant: Samsung Electronics Co., Ltd., Suwon-si (KR)

(72) Inventors: Sooyoung Ji, Suwon-si (KR); Heeseok Eun, Suwon-si (KR); Seunghan Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 38 days.

(21) Appl. No.: 18/495,930

(22) Filed: Oct. 27, 2023

(65) Prior Publication Data

US 2024/0273052 A1 Aug. 15, 2024

(30) Foreign Application Priority Data

Feb. 14, 2023 (KR) ........................ 10-2023-0019673

(51) Int. Cl. \
*G06F 13/42* (2006.01)

(52) U.S. Cl. \
CPC .. *G06F 13/4282* (2013.01); *G06F 2213/0002* (2013.01)

(58) Field of Classification Search \
None \
See application file for complete search history.

(56) References Cited

U.S. PATENT DOCUMENTS

| | | | |
|---|---|---|---|
| 7,743,232 B2 | 6/2010 | Shen et al. | |
| 7,937,574 B2 | 5/2011 | Clark et al. | |
| 10,255,077 B2 | 4/2019 | Ben-Kiki et al. | |
| 10,402,743 B1 | 9/2019 | Rigetti et al. | |
| 10,423,463 B1 | 9/2019 | Wilt | |
| 11,275,581 B2 | 3/2022 | Ramesh | |
| 2020/0225946 A1* | 7/2020 | Rosti .......................... | G06F 9/28 |
| 2021/0096848 A1 | 4/2021 | Jayakumar et al. | |
| 2021/0103662 A1 | 4/2021 | Ashok et al. | |
| 2022/0066636 A1* | 3/2022 | Taki ...................... | G06F 3/0679 |

OTHER PUBLICATIONS

Schweitzer, Scott. "How PCle 5 with CXL, CCIX, and SmartNICs Will Change Solution Acceleration." Jul. 2020 (with English translation). https://www.seminet.co.kr/channel_micro.html?menu=content_sub&com_no=771&category=article&no=7034#.

* cited by examiner

*Primary Examiner* — Farley Abad

*Assistant Examiner* — Dayton Lewis-Taylor

(74) *Attorney, Agent, or Firm* — Harness, Dickey & Pierce, P.L.C.

(57) ABSTRACT

An electronic device includes a processor, an interface bus connected to the processor, and a plurality of compute express link (CXL) devices connected to the interface bus, the plurality of CXL devices including two or more different types of CXL devices. The processor is configured to output a combined program code to the interface bus, the combined program code including a plurality of program codes, each of the plurality of CXL devices are configured to receive the combined program code from the interface bus, and each of the plurality of CXL devices is configured to store one of the plurality of program codes of the combined program code which corresponds to a type of the CXL device, in order to change operation of the CXL device according to the stored one of the plurality of program codes.

20 Claims, 14 Drawing Sheets

<u>CR1a</u>

Smart SSD

| DRAM | CONT | FPGA |

SPG: RTL

SPG: HIL

| NVM | NVM | NVM |

<u>CR1b</u>

SPG: OS Program

Smart SSD

| DRAM | CONT<br>ARM | FPGA |

SPG: RTL

SPG: HIL

| NVM | NVM | NVM |

| OPT1 | OPT2 | OPT3 | OPT4 |
|------|------|------|------|
| RTL | RTL | RTL | RTL |
| HIL | HIL | OS PGM )MT | OS PGM )MT |
| | OS PGM | OS PGM | OS PGM ML |
| REQ | REQ | REQ | REQ |
| LUT | LUT; MT, ML | LUT; ML | LUT |

ELECTRONIC DEVICE MANAGING COMPUTING POWERS OF PERIPHERAL ELECTRONIC DEVICES AND OPERATING METHOD OF ELECTRONIC DEVICE

CROSS-REFERENCE TO RELATED APPLICATION

This application claims priority under 35 U.S.C. § 119 to Korean Patent Application No. 10-2023-0019673 filed on Feb. 14, 2023, in the Korean Intellectual Property Office, the disclosure of which is incorporated by reference herein in its entirety.

BACKGROUND

Some example embodiments of the inventive concepts relate to an electronic device, including an electronic device jointly managing computing powers of peripheral electronic devices and an operating method of the electronic device.

BACKGROUND

An electronic device may include at least one processor and peripheral devices. The at least one processor may take full charge of operations which may be desirable or necessary for the electronic device. At least one of the peripheral devices may be implemented with a smart peripheral device. The smart peripheral device may have a computing power.

The at least one processor may assign some of the operations of the at least one processor to the at least one smart peripheral device by programming the at least one smart peripheral device. When the number of smart peripheral devices increases, the at least one processor may have an overhead on programming for each of the smart peripheral devices.

SUMMARY

Some example embodiments of the inventive concepts reduce an overhead of at least one processor which programs smart peripheral devices. Some example embodiments of the inventive concepts allow smart peripheral devices to process a task through interaction.

According to an example embodiment, an electronic device includes a processor, an interface bus connected to the processor, and a plurality of compute express link (CXL) devices connected to the interface bus, the plurality of CXL devices including two or more different types of CXL devices. The processor is configured to output a combined program code to the interface bus, the combined program code including a plurality of program codes, each of the plurality of CXL devices are configured to receive the combined program code from the interface bus, and each of the plurality of CXL devices is configured to store one of the plurality of program codes of the combined program code which corresponds to a type of the CXL device, in order to change operation of the CXL device according to the stored one of the plurality of program codes.

According to an example embodiment, an electronic device includes a nonvolatile memory device, and a controller configured to communicate with an external interface bus and to control the nonvolatile memory device, wherein the controller is configured to receive a combined program code from the external interface bus, the combined program code including a plurality of program codes, and the controller is configured to store a corresponding one of the plurality of program codes of the combined program code, in order to change operation of the controller according to the stored one of the plurality of program codes.

According to an example embodiment, an operating method of an electronic device which includes a nonvolatile memory device and a controller includes receiving, at the controller, a combined program code from an external interface bus, the combined program code including a plurality of micro codes and a plurality of program codes corresponding to the plurality of micro codes, identifying, at the controller, one of the plurality of program codes corresponding to a type of the electronic device by executing the plurality of micro codes, and storing, at the controller, the corresponding one of the plurality of program codes, in order to change operation of the controller according to the stored one of the plurality of program codes.

BRIEF DESCRIPTION OF THE FIGURES

The above and other features of the inventive concepts will become apparent by describing in detail example embodiments thereof with reference to the accompanying drawings.

FIG. 14 illustrates an additional example embodiment of four options in which a first computation resource performs a task.

DETAILED DESCRIPTION

Below, some example embodiments of the inventive concepts will be described in detail and clearly to such an extent that a person having ordinary skill in the art can carry out the inventive concepts.

Figure 1:
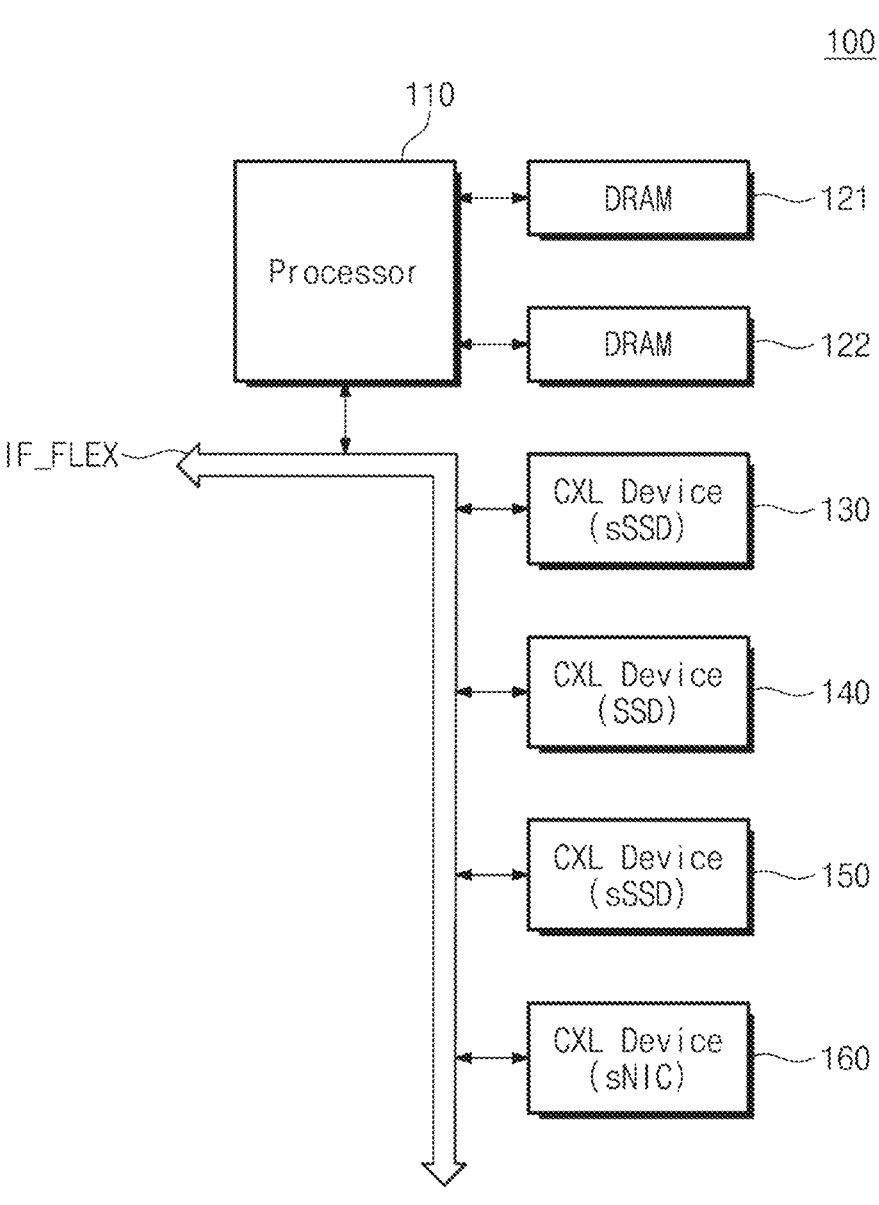
FIG. 1 illustrates an electronic device according to an example embodiment of the inventive concepts.

FIG. 1 illustrates an electronic device 100 according to an example embodiment of the inventive concepts. Referring to FIG. 1, the electronic device 100 may include a processor 110, first and second dynamic random access memories (DRAMs) 121 and 122, first to fourth compute express link (CXL) devices 130, 140, 150, and 160, and a flex interface bus IF_FLEX.

In an example embodiment, the processor 110 may include a central processing unit CPU. The central processing unit CPU may include two or more cores operating independently of each other or in connection therewith. The processor 110 may include various accelerators (or acceleration processors), which are configured to perform unique operations/computations, such as a graphics processing unit (GPU), a digital signal processor (DSP), an image signal processor (ISP), and a neural processing unit (IPU) processing unit (NPU), but example embodiments are not limited thereto. The accelerators (or acceleration processors) may be integrated in one semiconductor package as a plurality of cores together with the central processing unit CPU or may be implemented with two or more separate semiconductor packages separated from each other.

The processor 110 may use the first and second dynamic random access memories 121 and 122 as a main memory. The processor 110 may communicate with peripheral devices through the flex interface bus IF_FLEX. For example, the flex interface bus IF_FLEX may flexibly support the PCIe (Peripheral Component Interconnect express) and the CXL (Compute eXpress Link).

The peripheral devices connected to the flex interface bus IF_FLEX may include the first to fourth CXL devices 130, 140, 150, and 160. The first to fourth CXL devices 130, 140, 150, and 160 may communicate with the processor 110 through the flex interface bus IF_FLEX based on the PCIe. Also, each of the first to fourth CXL devices 130, 140, 150, and 160 may communicate with the processor 110 and any other CXL devices through the flex interface bus IF_FLEX based on the CXL.

The first CXL device 130 may be, for example, a smart solid state drive (SSD). The first CXL device 130 may have a computing power capable of performing some of the computations of the processor 110 instead of the processor 110 performing those computations.

For example, the first CXL device 130 may include a separate core(s) for performing the computations of the processor 110.

The second CXL device 140 may be, for example, an SSD (e.g., a CXL SSD). The second CXL device 140 may be limited compared to the smart SSD but may have a computing power capable of performing some of the computations of the processor 110 instead of the processor 110 performing those computations. For example, the second CXL device 140 may not include a separate core for performing the computations of the processor 110.

The third CXL device 150 may be, for example, a smart SSD. The third CXL device 150 may have a computing power capable of performing some of the computations of the processor 110 instead of the processor 110 those computations. For example, the third CXL device 150 may include a separate core(s) for performing the computations of the processor 110.

The fourth CXL device 160 may be, for example, a network-in-chip (NIC). The fourth CXL device 160 may have a computing power capable of performing some of the computations of the processor 110 instead of the processor 110. For example, the fourth CXL device 160 may include a separate core(s) for performing the computations of the processor 110.

In an example embodiment, the first to fourth CXL devices 130 to 160 may be electronic devices operating as sub-components (or peripheral devices) of the electronic device 100.

Figure 2:
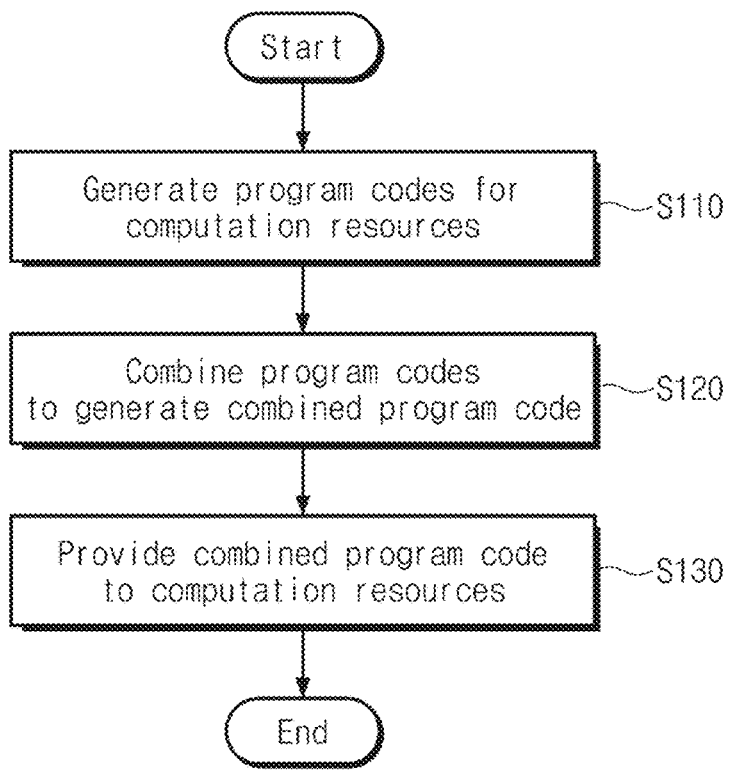
FIG. 2 illustrates an example embodiment of a method of generating a program code for programming components of an electronic device of FIG. 1.

FIG. 2 illustrates an example embodiment of a method of generating a program code for programming components of the electronic device 100 of FIG. 1. The method of FIG. 2 may be performed by one computer or two or more computers.

Referring to FIGS. 1 and 2, in operation S110, the computer may generate program codes for computation resources of the electronic device 100. Each of the computation resources may be a CXL device of one type. Different computation resources may be CXL devices of different types. For example, different computation resources (or CXL devices of different types) may include a smart SSD, an SSD (e.g., a CXL SSD), and other CXL devices, but example embodiments are not limited thereto.

In the electronic device 100 of FIG. 1, the smart SSD may include the first CXL device 130 and the third CXL device 150. The SSD may include the second CXL device 140. The other CXL devices may include the fourth CXL device 160 being a smart NIC. In an example embodiment, the description is given as the number of different computation resources (or CXL devices of different types) is "3", but the number of different computation resources (or CXL devices of different types) is not limited thereto. The number of different computation resources (or CXL devices of different types) may change depending on the implementation of the electronic device 100.

In operation S120, the computer may combine the program codes to generate a combined program code. For example, the program codes for the different computation resources (or CXL devices of different types) generated in operation S110 may be combined into one program code, for example, a combined program code.

In operation S130, the computer may provide the combined program code to computation resources. For example, the processor 110 may provide the combined program code to the first to fourth CXL devices 130 to 160 in common. For example, the processor 110 may provide the combined program code to the first to fourth CXL devices 130 to 160 through the flex interface bus IF_FLEX simultaneously or sequentially.

In an example embodiment, the computer performing the method of FIG. 2 may be the electronic device 100 of FIG. 1. By performing the method of FIG. 2, the electronic device 100 of FIG. 1 may generate the combined program code and may provide the combined program code to the first to fourth CXL devices 130 to 160.

As another example embodiment, the computer performing the method of FIG. 2 may be composed of the electronic device 100 of FIG. 1 and a separate computer independent of the electronic device 100 of FIG. 1. The separate computer may generate the combined program code by performing operation S110 and operation S120. The combined program code may be transferred to the electronic device 100 through a storage medium or a communication line. The electronic device 100 may provide the combined program code to the first to fourth CXL devices 130 to 160 by performing operation S130.

Figure 3:
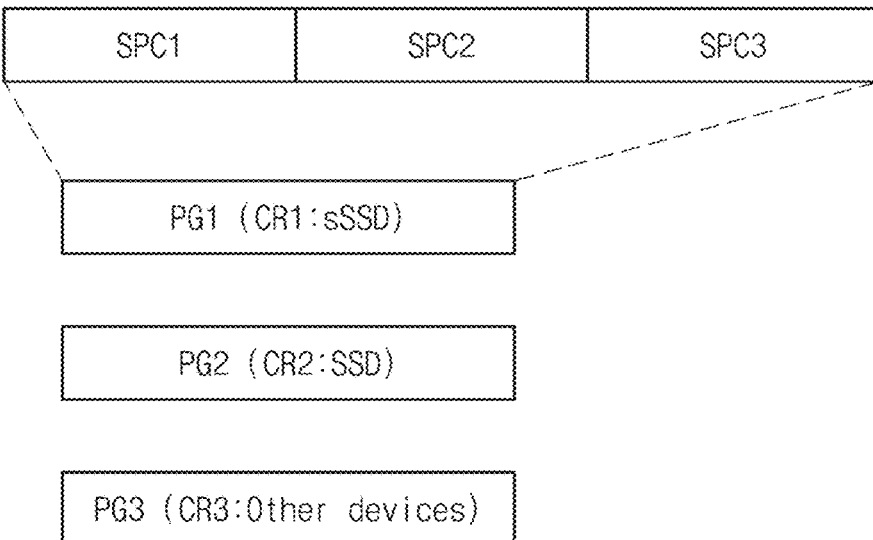
FIG. 3 illustrates an example embodiment of first to third program codes for first to third computation resources.

FIG. 3 illustrates an example embodiment of first to third program codes PG1 to PG3 for first to third computation resources CR1 to CR3. Referring to FIGS. 1 and 3, the first program code PG1 may be for the first computation resource CR1. The first computation resource CR1 may be a smart SSD (sSSD). The first program code PG1 may include codes that cause the smart SSD to perform a specific task (e.g., a task(s) assigned to the smart SSD from among tasks of the processor 110).

In an example embodiment, the smart SSD may be implemented by various generations. An initial-generation smart SSD may include one core (e.g., a separate core for performing computations of the processor 110) such as a field programmable gate array (FPGA). As the generation of the smart SSD evolves, the number and types of cores included in the smart SSD and a kind of a core included therein may vary.

The first program code PG1 for the smart SSD may include a plurality of sub-program codes for various cores (e.g., separate cores for performing computations of the processor 110). Different sub-program codes may be respectively executed by cores of different types (e.g., separate cores for performing computations of the processor 110).

In an example embodiment, the first program code PG1 for the smart SSD may include first to third sub-program codes SPC1 to SPC3. However, the number of sub-program codes included in the first program code PG1 for the smart SSD is not limited thereto.

The second program code PG2 may be for the second computation resource CR2. The second computation resource CR2 may be an SSD (e.g., a CXL SSD). The second program code PG2 may include codes that cause the SSD (e.g., CXL SSD) to perform a specific task (e.g., a task(s) assigned to the SSD from among tasks of the processor 110).

The third program code PG3 may be for the third computation resource CR3. The third computation resource CR3 may be other devices (e.g., a smart NIC). The third program code PG3 may include codes that cause the other devices (e.g., a smart NIC) to perform a specific task (e.g., a task(s) assigned to the other devices from among tasks of the processor 110).

In an example embodiment, the electronic device 100 may further include other smart devices or CXL devices in addition to the smart NIC as the other devices. For example, the electronic device 100 may include other devices of two or more different types.

In some example embodiments, as described with reference to the first program code PG1, the third program code PG3 may include two or more sub-program codes for the other devices of two or more different types. Alternatively, the third program code PG3 may include two or more different program codes respectively corresponding to the other devices of two or more different types. As will be described with reference to FIG. 5, the sub-program code and the program code may differ in terms of a micro code. The program code may have a relevant micro code, but the sub-program code may not have a relevant micro code.

In an example embodiment, the first program code PG1, the second program code PG2, and the third program code PG3 may include codes that cause the first computation resource CR1, the second computation resource CR2, and the third computation resource CR3 to distribute and perform a common task assigned by the processor 110.

In an example embodiment, the first computation resource CR1, the second computation resource CR2, and the third computation resource CR3 may be based on the CXL. The CXL may cause the first computation resource CR1, the second computation resource CR2, and the third computation resource CR3 to communicate with each other through the flex interface bus IF_FLEX without intervention of the processor 110.

The first program code PG1, the second program code PG2, and the third program code PG3 may cause the first computation resource CR1, the second computation resource CR2, and the third computation resource CR3 to co-work a common task by performing interactions based on the CXL.

Figure 4:
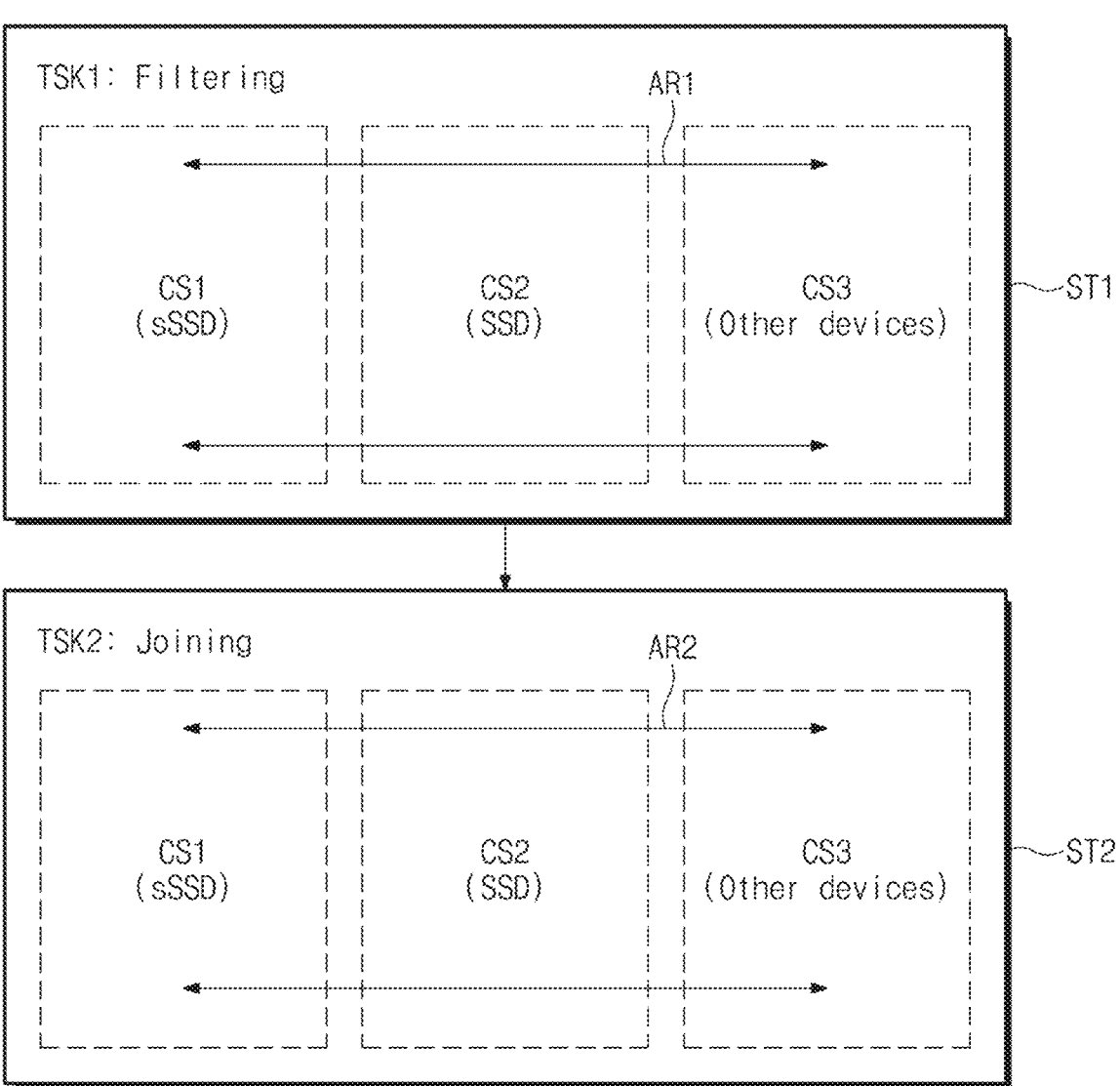
FIG. 4 illustrates an example embodiment in which first to third computation resources perform a task assigned by a processor.

FIG. 4 illustrates an example embodiment in which the first to third computation resources CR1 to CR3 perform a task TSK assigned by the processor 110. Referring to FIGS. 1, 3, and 4, in an example embodiment, the task TSK may include a first stage ST1 and a second stage ST2. The first stage ST1 and the second stage ST2 may be serial tasks. For example, the first to third computation resources CR1 to CR3 may complete the task of the first stage ST1 and may then start the task of the second stage ST2.

The first stage ST1 may include a first task TSK1. For example, the first task TSK1 may be filtering. The filtering may include an operation of filtering a specific keyword from data (e.g., data of a database) stored in the smart SSD or the SSD (e.g., CXL SSD). As shown by a first arrow AR1, the first to third computation resources CR1 to CR3 may co-work the first task TSK1 by performing interactions based on the CXL.

The second stage ST2 may include a second task TSK2. For example, the second task TSK2 may be joining. The joining may include an operation of merging data (e.g., data of a database) stored in the smart SSD or the SSD (e.g., CXL SSD) based on a computation equation designated by the processor 110. As shown by a second arrow AR2, the first to third computation resources CR1 to CR3 may co-work the second task TSK2 by performing interactions based on the CXL.

In an example embodiment, the first computation resource CR1 may be the smart SSD (sSSD) and may include the first CXL device 130 and the third CXL device 150. The second computation resource CR2 may be the SSD (e.g., a CXL SSD) and may include the second CXL device 140. The third computation resource CR3 may be the other devices and may include, for example, the fourth CXL device 160 being a smart NIC.

As described above, the first to third computation resources CR1 to CR3 may perform interactions based on the CXL, and the processor 110 may program the first to third computation resources CR1 to CR3 such that the first to third computation resources CR1 to CR3 co-work a common task.

However, in some example embodiments where the processor 110 programs the first to third computation resources CR1 to CR3 independently of each other, the processor 110 has an overhead on independent management of programs of the first to third computation resources CR1 to CR3. For example, when partially updating one of the first to third program codes PG1 to PG3, the processor 110 may share version information of the updated program code with all the other program codes. When the processor 110 intends to update a task, the processor 110 may again program all the first to third computation resources CR1 to CR3 independently of each other.

The electronic device 100 according to an example embodiment of the inventive concepts may reduce the overhead on management of the programs of the first to third computation resources CR1 to CR3 by providing a combined program code including the first to third program codes PG1 to PG3 to the first to third computation resources CR1 to CR3.

Figure 5:
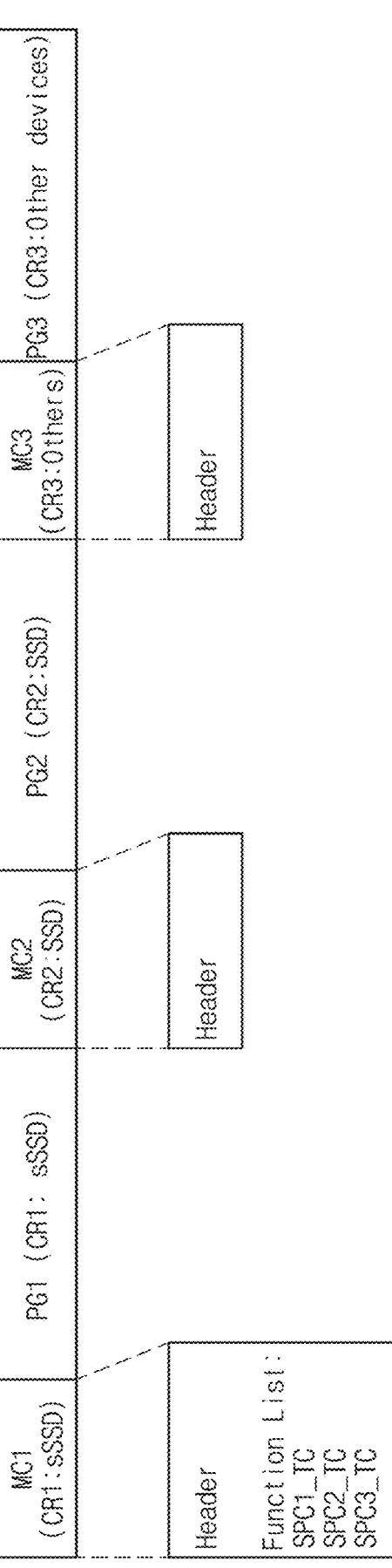
FIG. 5 illustrates an example embodiment of a combined program code.

FIG. 5 illustrates an example embodiment of a combined program code. Referring to FIGS. 1, 3, and 5, a combined program code may include the first to third program codes PG1 to PG3, and first to third micro codes MC1 to MC3 respectively corresponding to the first to third program codes PG1 to PG3.

The first micro code MC1 and the first program code PG1 may be for the first computation resource CR1, for example, the smart SSD (sSSD). The first micro code MC1 may include a header and a function list. The header may return (or output), when executed by the first to fourth CXL devices 130 to 160, a value indicating a type of the first computation resource CR1, for example, the smart SSD (sSSD).

The function list may include test codes executable by the first computation resource CR1, for example, the smart SSD (sSSD). For example, the function list may include first to third sub-program test codes SPC1_TC to SPC3_TC respectively corresponding to the first to third sub-program codes SPC1 to SPC3 of the first program code PG1. Like the first to third sub-program codes SPC1 to SPC3 executable by cores of different types, the first to third sub-program test codes SPC1_TC to SPC3_TC may be executed by cores of different types.

A length of each of the first to third sub-program test codes SPC1_TC to SPC3_TC may be shorter than a length of each of the first to third sub-program codes SPC1 to SPC3. Each of the first to third sub-program test codes SPC1_TC to SPC3_TC may include a combination of codes or routines which may be desirable or essential from among codes or routines included in each of the first to third sub-program codes SPC1 to SPC3. Alternatively, each of the first to third sub-program test codes SPC1_TC to SPC3_TC may be codes or routines in which codes or routines of each of the first to third sub-program codes SPC1 to SPC3 are abstracted.

The second micro code MC2 and the second program code PG2 may be for the second computation resource CR2, for example, the SSD (e.g., a CXL SSD). The second micro code MC2 may include a header. The header may return (or output), when executed by the first to fourth CXL devices 130 to 160, a value indicating a type of the second computation resource CR2, for example, the SSD (e.g., a CXL SSD).

The third micro code MC3 and the third program code PG3 may be for the third computation resource CR3, for example, the other devices (e.g., including a smart NIC). The third micro code MC3 may include a header. The header may return (or output), when executed by the first to fourth CXL devices 130 to 160, a value indicating a type of the third computation resource CR3, for example, the other devices.

For example, the electronic device 100 may include other devices of two or more different types. The third program code PG3 may include sub-program codes for the other devices of two or more different types. In some example embodiments, the third micro code MC3 may further include a list of the other devices of two or more different types and a list of pointers pointing out positions of sub-program codes corresponding thereto.

As another example embodiment, the third program code PG3 may include two or more program codes respectively corresponding to other devices of two or more different types, and the third micro code MC3 may include two or more micro codes respectively corresponding to the two or more program codes. The two or more micro codes may return (or output), when executed by the first to third computation resources CR1 to CR3, a value indicating each of the other devices of two or more different types.

In an example embodiment, the first to third micro codes MC1 to MC3 may include general function list (GFL) micro codes.

Figure 6:
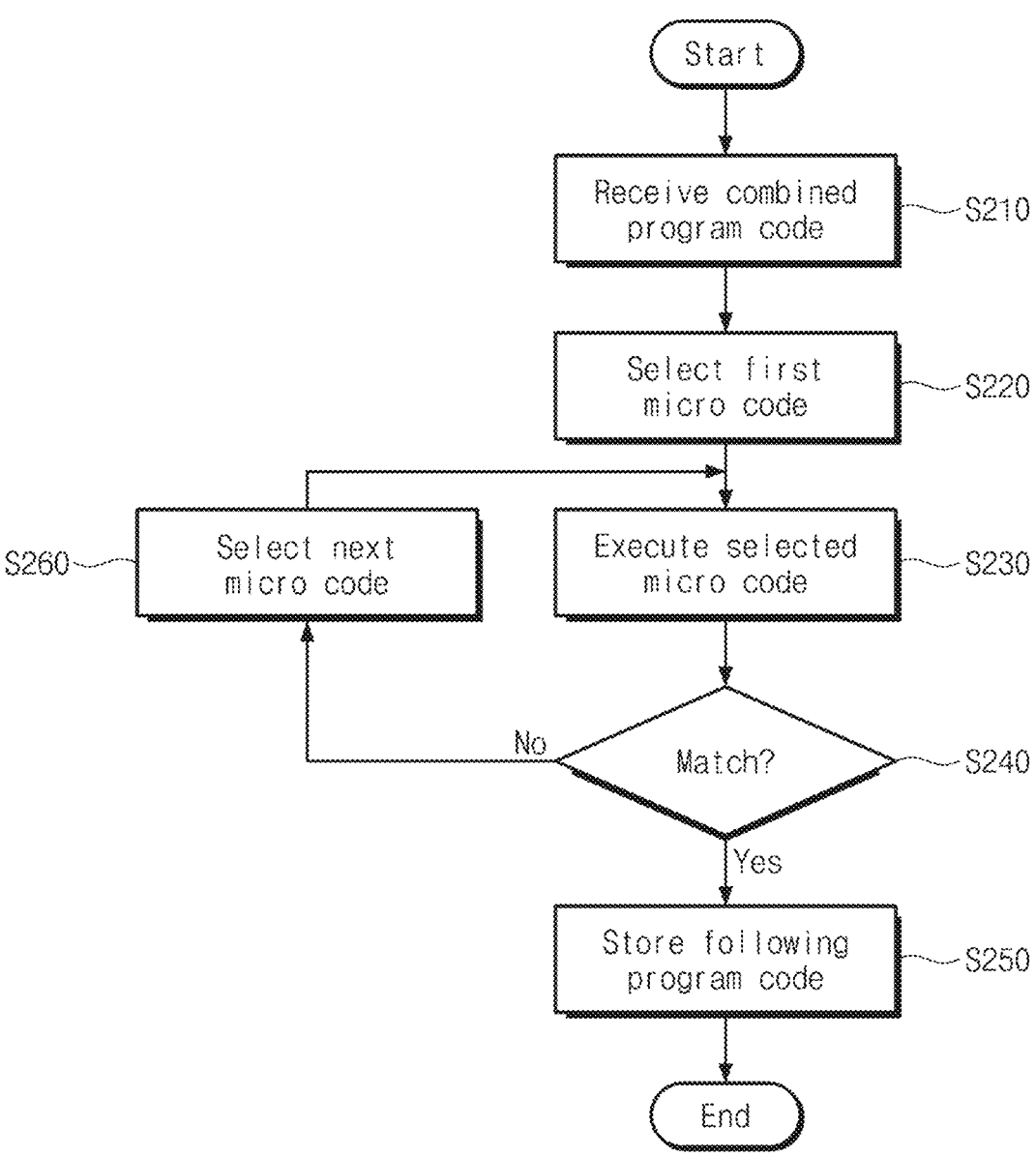
FIG. 6 illustrates an example embodiment of a method in which each of first to third computation resources stores a corresponding program code from a combined program code.

FIG. 6 illustrates an example of a method in which each of the first to third computation resources CR1 to CR3 stores a corresponding program code from a combined program code. Referring to FIGS. 1, 5, and 6, in operation S210, each of the first to third computation resources CR1 to CR3 may receive a combined program code. For example, each of the first to third computation resources CR1 to CR3 may receive the combined program code from the processor 110 through the flex interface bus IF_FLEX.

In operation S220, each of the first to third computation resources CR1 to CR3 may select a first micro code. For example, each of the first to third computation resources CR1 to CR3 may select the first micro code MC1 among the first to third micro codes MC1 to MC3 of the combined program code.

In operation S230, each of the first to third computation resources CR1 to CR3 may execute the selected micro code. For example, each of the first to third computation resources CR1 to CR3 may select the first micro code MC1 thus selected. In an example embodiment, executing a micro code may be different from comparing a value of the micro code with a given value. The micro code (e.g., a code of a header) may be a digital instruction(s). Each of the first to third computation resources CR1 to CR3 may execute the digital instruction(s) and may obtain a result to be returned or output as an execution result of the digital instruction(s).

In operation S240, each of the first to third computation resources CR1 to CR3 may determine whether the execution result of the selected micro code is matched. For example, each of the first to third computation resources CR1 to CR3 may determine whether type information obtained as the execution result of the selected micro code is matched with type information of each of the first to third computation resources CR1 to CR3.

When the type information obtained as the execution result of the selected micro code is matched with the type information of each of the first to third computation resources CR1 to CR3, in operation S250, each of the first to third computation resources CR1 to CR3 may store a program code (e.g., the first program code PG1) following the selected micro code (e.g., the first micro code MC1). Afterwards, each of the first to third computation resources CR1 to CR3 may end the operation of storing the program code.

When the type information obtained as the execution result of the selected micro code is not matched with the type information of each of the first to third computation resources CR1 to CR3, in operation S260, each of the first to third computation resources CR1 to CR3 may select a next micro code in the combined program code. Afterwards, in operation S230 and operation S240, each of the first to third computation resources CR1 to CR3 may determine whether the selected micro code is matched with a type of each of the first to third computation resources CR1 to CR3.

As described above, each of the first to third computation resources CR1 to CR3 may identify and store a program code matched with each of the first to third computation resources CR1 to CR3 from among the first to third program codes PG1 to PG3 of the combined program code by executing the first to third micro codes MC1 to MC3 of the combined program code. Accordingly, the processor 110 may program the first to third computation resources CR1 to CR3 at a same time by using one combined program code, and thus, the overhead that the processor 110 programs the first to third computation resources CR1 to CR3 independently of each other may be resolved.

Figures 7A, 7B:
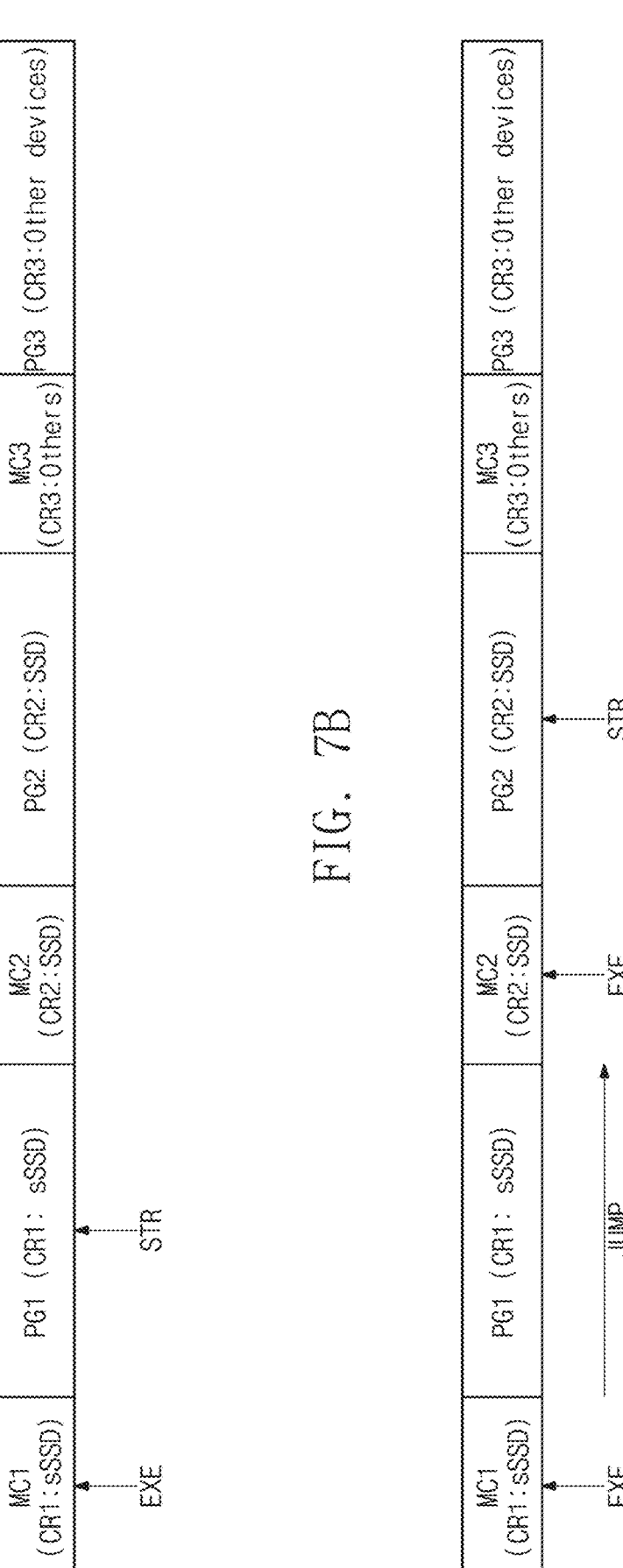
FIGS. 7A, 7B, and 7C illustrate example embodiments in which first to third computation resources store corresponding program codes.
Figure 7C:
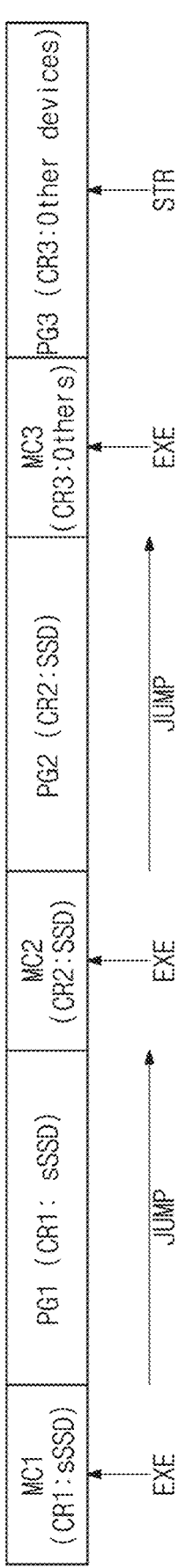

FIGS. 7A, 7B, and 7C illustrate examples in which the first to third computation resources CR1 to CR3 store corresponding program codes. Referring to FIGS. 1 and 7A, the first computation resource CR1 may execute the first micro code MC1 (e.g., refer to EXE in FIG. 7A). When the first micro code MC1 is executed, the first computation resource CR1 may obtain type information indicating the smart SSD (sSSD). The type of the first computation resource CR1 may be the smart SSD (sSSD). Accordingly, the first computation resource CR1 may store the first program code PG1 corresponding to the first micro code MC1 (e.g., refer to STR in FIG. 7A). For example, the first CXL device 130 and the third CXL device 150 may store the first program code PG1.

Referring to FIGS. 1 and 7B, the second computation resource CR2 may execute the first micro code MC1 (e.g., refer to EXE in FIG. 7B). When the first micro code MC1 is executed, the second computation resource CR2 may obtain the type information indicating the smart SSD (sSSD). The type of the second computation resource CR2 may not be the smart SSD (sSSD). Accordingly, the second computation resource CR2 may ignore the first program code PG1 of the combined program code and may jump to the second micro code MC2 (e.g., refer to JUMP in FIG. 7B).

The second computation resource CR2 may execute the second micro code MC2 (e.g., refer to EXE in FIG. 7B). When the second micro code MC2 is executed, the second computation resource CR2 may obtain type information indicating the SSD (e.g., a CXL SSD). The type of the second computation resource CR2 may be the SSD (e.g., a CXL SSD). Accordingly, the second computation resource CR2 may store the second program code PG2 corresponding to the second micro code MC2. For example, the second CXL device 140 may store the second program code PG2 (e.g., refer to STR in FIG. 7B).

Referring to FIGS. 1 and 7C, the third computation resource CR3 may execute the first micro code MC1 (e.g., refer to EXE in FIG. 7C). When the first micro code MC1 is executed, the third computation resource CR3 may obtain the type information indicating the smart SSD (sSSD). The type of the third computation resource CR3 may not be the smart SSD (sSSD).

Accordingly, the third computation resource CR3 may ignore the first program code PG1 of the combined program code and may jump to the second micro code MC2 (e.g., refer to JUMP in FIG. 7C).

The third computation resource CR3 may execute the second micro code MC2 (e.g., refer to EXE in FIG. 7C). When the second micro code MC2 is executed, the third computation resource CR3 may obtain the type information indicating the SSD (e.g., a CXL SSD). The type of the third computation resource CR3 may not be the SSD (e.g., a CXL SSD). The third computation resource CR3 may ignore the second program code PG2 of the combined program code and may jump to the third micro code MC3 (e.g., refer to JUMP in FIG. 7C).

The third computation resource CR3 may execute the third micro code MC3 (e.g., refer to EXE in FIG. 7C). When the third micro code MC3 is executed, the third computation resource CR3 may obtain type information indicating other devices. The type of the third computation resource CR3 may be the other devices. Accordingly, the third computation resource CR3 may store the third program code PG3 corresponding to the third micro code MC3. For example, the fourth CXL device 160 may store the third program code PG3 (e.g., refer to STR in FIG. 7C).

As described with reference to FIGS. 7A to 7C, when a result of executing a micro code is not a corresponding type, each of the first to third computation resources CR1 to CR3 may jump to a next micro code. A time taken for each of the first to third computation resources CR1 to CR3 to identify the corresponding micro code may be a time taken to execute a maximum of three micro codes. Accordingly, each of the first to third computation resources CR1 to CR3 may quickly identify the corresponding program code.

Figure 8:
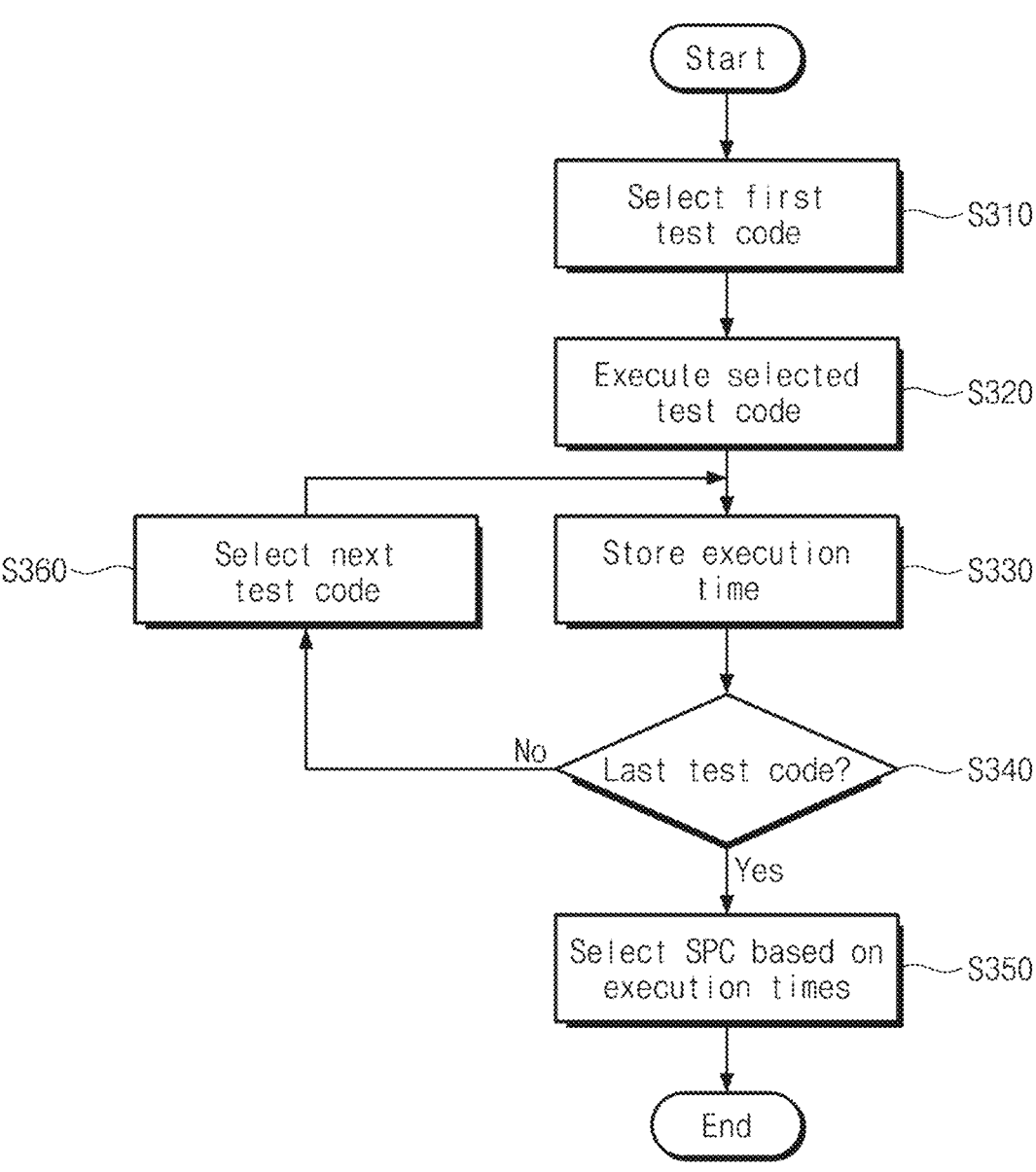
FIG. 8 illustrates an example embodiment of a method in which a first computation resource selects one of a plurality of sub-program codes.

FIG. 8 illustrates an example embodiment of a method in which the first computation resource CR1 selects one of a plurality of sub-program codes. For example, the first computation resource CR1 may be the smart SSD including the first CXL device 130 and the third CXL device 150.

Referring to FIGS. 1, 3, 5, and 8, in operation S310, the first computation resource CR1 may select a test code. For example, the first computation resource CR1 may select the first sub-program test code SPC1_TC corresponding to the first sub-program code SPC1 from among the first to third sub-program test codes SPC1_TC to SPC3_TC respectively corresponding to the first to third sub-program codes SPC1 to SPC3.

In operation S320, the selected first computation resource CR1 may execute the selected test code. For example, the first computation resource CR1 may execute the first sub-program test code SPC1_TC thus selected.

In operation S330, the first computation resource CR1 may store an execution time. For example, the first computation resource CR1 may store a time from a time when the first sub-program test code SPC1_TC thus selected is executed to a time when the execution of the first sub-program test code SPC1_TC is completed, as the execution time of the first sub-program test code SPC1_TC.

In operation S340, the first computation resource CR1 may determine whether the selected test code is the last test code. For example, the first computation resource CR1 may determine whether all the execution times of the first to third sub-program test codes SPC1_TC to SPC3_TC are stored.

When the selected test code is the last test code, in operation S350, the first computation resource CR1 may select a sub-program code SPC based on the execution times. For example, the first computation resource CR1 may select a sub-program code corresponding to a sub-program test code whose execution time is the shortest.

When the selected test code is not the last test code, in operation S360, the first computation resource CR1 may select a next test code. Afterwards, the first computation resource CR1 may store the execution time of the selected test code in operation S330.

In an example embodiment, the first computation resource CR1 may cause a core capable of executing the selected sub-program code to execute the selected sub-program code.

For example, the core capable of executing the selected sub-program code may execute the selected sub-program code.

As another example, the first computation resource CR1 may select a core capable of executing the selected sub-program code as a main core. The main core may perform a task based on load balancing with any other core(s). The main core may execute the selected sub-program code, and the other core(s) may execute a relevant sub-program code (s). The load for performing the task may be distributed to the main core and the other core(s).

In an example embodiment, the first computation resource CR1 may not include a core capable of executing at least one sub-program code among the first to third sub-program codes SPC1 to SPC3. In some example embodiments, the method of FIG. 8 may only execute sub-program codes executable by the first computation resource CR1 and sub-program test codes corresponding thereto.

Figures 9A, 9B:
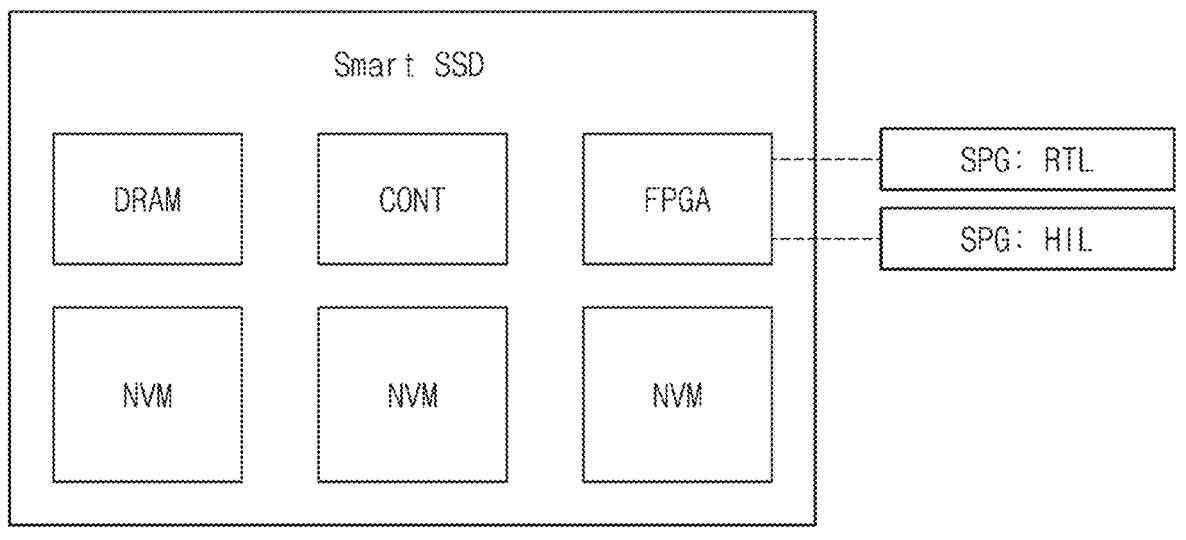
FIGS. 9A to 9D illustrate example embodiments of a first computation resource and program codes executable by the first computation resource.

FIGS. 9A to 9D illustrate examples of the first computation resource CR1 and program codes executable by the first computation resource CR1. Referring to FIGS. 1 and 9A, a 1a-th computation resource CR1a may be the smart SSD including the first CXL device 130 or the third CXL device 150. The smart SSD may include nonvolatile memory devices NVM, a controller CONT, a dynamic random access memory DRAM, and an FPGA, but example embodiments are not limited thereto.

The nonvolatile memory devices NVM may include of various nonvolatile memories such as a flash memory, a phase-change memory, a ferroelectric memory, a magnetic memory, and a resistive memory, but example embodiments are not limited thereto.

The controller CONT may perform the write operation or the read operation on the nonvolatile memory devices NVM in response to a request (e.g., a write request or a read request) received from the processor 110 through the flex interface bus IF_FLEX. The controller CONT may translate logical addresses transferred from the processor 110 into physical addresses of the nonvolatile memory devices NVM.

The controller CONT may perform various background operations for managing the nonvolatile memory devices NVM or data written in the nonvolatile memory devices NVM. For example, the controller CONT may perform various operations such as garbage collection, read reclaim, read retry, and wear leveling, as background operations.

The controller CONT may use the dynamic random access memory DRAM as a buffer memory that stores data to be written in the nonvolatile memory devices NVM or data read from the nonvolatile memory devices NVM. The controller CONT may use the dynamic random access memory DRAM as a meta memory for storing a mapping table that is used to translate logical addresses into physical addresses. The controller CONT may use the dynamic random access memory DRAM as a system memory that stores codes of firmware of the smart SSD.

The controller CONT may execute a corresponding sub-program test code among sub-program test codes of the program code of the 1a-th computation resource CR1a and a corresponding sub-program code among sub-program codes, by using the FPGA. For example, the sub-program test code and the sub-program code that are executable by the FPGA may include a RTL (Register-Transfer Level) code and an HIL (Hardware-In-the-Loop) code. That is, the 1a-th computation resource CR1a may execute a sub-program test code and a sub-program code of the RTL code and a sub-program test code and a sub-program code of the HIL code.

Referring to FIGS. 1 and 9B, a 1b-th computation resource CR1b may be the smart SSD including the first CXL device 130 or the third CXL device 150. The smart SSD may include the nonvolatile memory devices NVM, the controller CONT, the dynamic random access memory DRAM, and the FPGA, but example embodiments are not limited thereto.

Compared to the 1a-th computation resource CR1a of FIG. 9A, the controller CONT of the 1b-th computation resource CR1b may include an ARM processor. The controller CONT may further execute a corresponding sub-program test code among sub-program test codes of the program code of the 1b-th computation resource CR1b and a corresponding sub-program code among sub-program codes, by using the ARM processor.

As described with reference to FIG. 9A, the sub-program test code and the sub-program code executable by the FPGA may include the RTL code and the HIL code. The ARM processor may execute a program of an operating system (e.g., an operating system in the smart SSD) executed by the ARM processor.

That is, the 1b-th computation resource CR1b may execute a sub-program test code and a sub-program code of the RTL code, a sub-program test code and a sub-program code of the HIL code, and a program code and a test code of the internal operating system.

Functions, which are the same or substantially the same as the functions of the components of the 1a-th computation resource CR1a, from among functions of the components of the 1b-th computation resource CR1b, may be omitted. Accordingly, the functions described with reference to the components of the 1a-th computation resource CR1a may be applied to the corresponding components of the 1b-th computation resource CR1b.

Figure 9C:
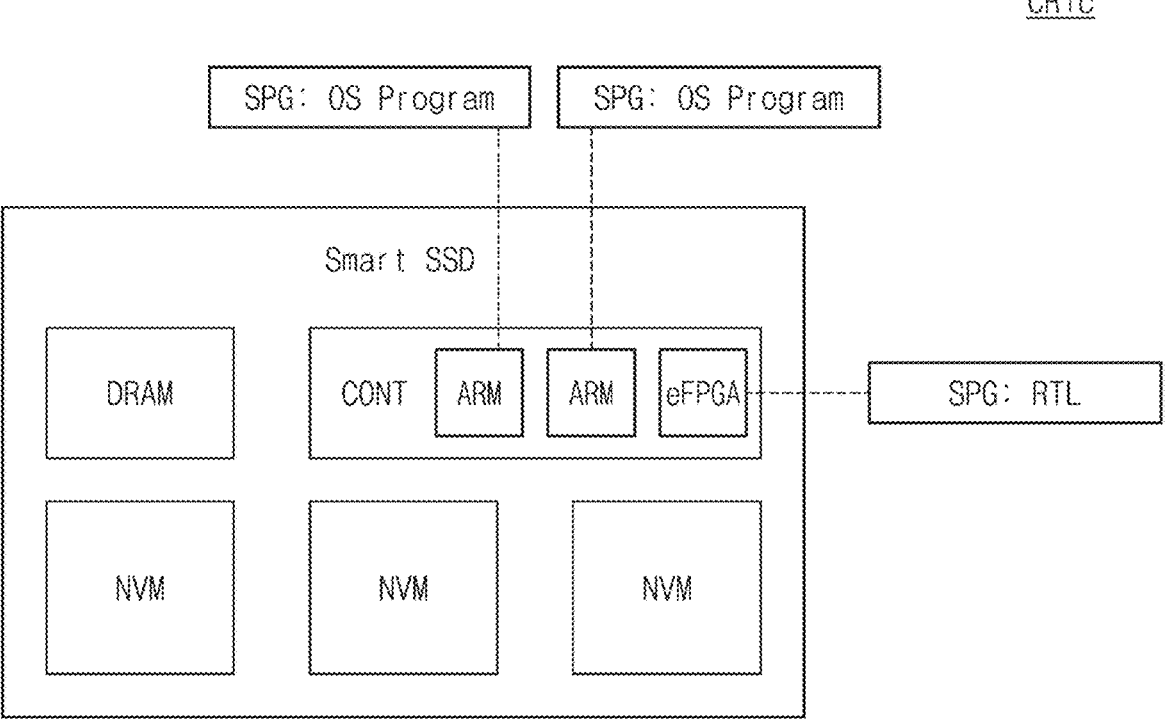

Referring to FIGS. 1 and 9C, a 1c-th computation resource CR1c may be the smart SSD including the first CXL device 130 or the third CXL device 150. The smart SSD may include the nonvolatile memory devices NVM, the controller CONT, and the dynamic random access memory DRAM, but example embodiments are not limited thereto.

Compared to the 1b-th computation resource CR1b of FIG. 9B, the controller CONT of the 1c-th computation resource CR1c may include two ARM processors. Also, the FPGA may be replaced with an embedded FPGA (eFPGA) mounted within the controller CONT. The controller CONT may execute a corresponding sub-program test code among sub-program test codes of the program code of the 1c-th computation resource CR1c and a corresponding sub-program code among sub-program codes, by using the two ARM processors. Also, the controller CONT may execute the corresponding sub-program test code among the sub-program test codes of the program code of the 1c-th computation resource CR1c and the corresponding sub-program code among the sub-program codes, by using the eFPGA.

The sub-program test code and the sub-program code executable by the eFPGA may include the RTL code. The two ARM processors may execute a program of an operating system (e.g., an operating system in the smart SSD) executed by the ARM processor.

That is, the 1c-th computation resource CR1c may execute a sub-program test code and a sub-program code of the RTL code and a program code and a test code of the internal operating system. Because the controller CONT includes two ARM processors, the 1c-th computation resource CR1c may support multi-threading of the program code of the internal operating system.

Functions, which are the same or substantially the same as the functions of the components of the 1a-th computation resource CR1a or the 1b-th computation resource CR1b, from among functions of the components of the 1c-th computation resource CR1c, may be omitted. Accordingly, the functions described with reference to the components of the 1a-th computation resource CR1a or the 1b-th computation resource CR1b may be applied to the corresponding components of the 1c-th computation resource CR1c.

Figure 9D:
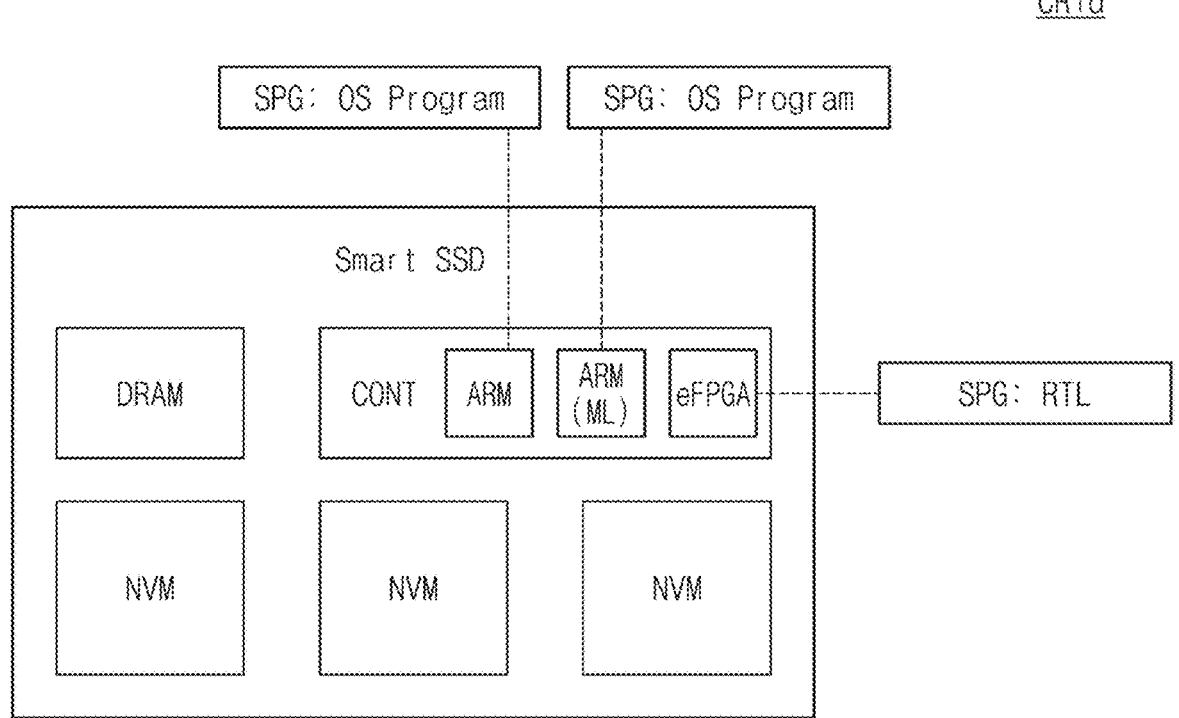

Referring to FIGS. 1 and 9D, a 1d-th computation resource CR1d may be the smart SSD including the first CXL device 130 or the third CXL device 150. The smart SSD may include the nonvolatile memory devices NVM, the controller CONT, and the dynamic random access memory DRAM, but example embodiments are not limited thereto.

Compared to the 1c-th computation resource CR1c of FIG. 9C, one ARM processor among the two ARM processors included in the controller CONT of the 1d-th computation resource CR1d may include a machine learning (ML) accelerator.

That is, the 1d-th computation resource CR1d may execute a sub-program test code and a sub-program code of the RTL code and a program code and a test code of the internal operating system. Because the controller CONT includes two ARM processors, the 1d-th computation resource CR1d may support multi-threading of the program code of the internal operating system. Because one ARM processor among the two ARM processors includes the machine learning (ML) accelerator, the 1d-th computation resource CR1d may support an accelerated machine learning operation.

Functions, which are the same or substantially the same as the functions of the components of the 1a-th computation resource CR1a, the 1b-th computation resource CR1b, or the 1c-th computation resource CR1c, from among functions of the components of the 1d-th computation resource CR1d, may be omitted. Accordingly, the functions described with reference to the components of the 1a-th computation resource CR1a, the 1b-th computation resource CR1b, or the 1c-th computation resource CR1c may be applied to the corresponding components of the 1d-th computation resource CR1d.

Any or all of the elements described with reference to FIGS. 9A-9D may communicate with any or all other elements described with reference to FIGS. 9A-9D. For example, any element may engage in one-way and/or two-way and/or broadcast communication with any or all other elements in FIGS. 9A-9D, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

Figure 10:
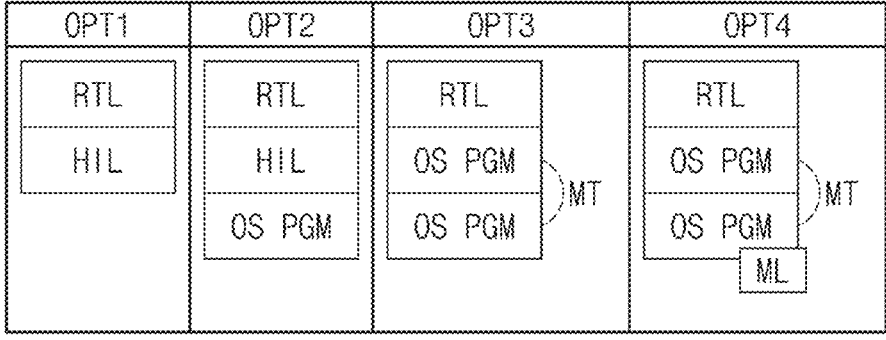
FIG. 10 illustrates an example embodiment of four options in which a first computation resource performs a task.

FIG. 10 illustrates an example embodiment of four options in which the first computation resource CR1 performs a task. Referring to FIGS. 1, 3, and 10, according to a first option OPT1, the first computation resource CR1 may select one of the RTL code and the HIL code belonging to the first to third sub-program codes SPC1 to SPC3 and may perform a task (as described with reference to FIG. 9A).

According to a second option OPT2, the first computation resource CR1 may select one of the RTL code, the RTL code, and an operating system program OS PGM belonging to the first to third sub-program codes SPC1 to SPC3 and may perform a task (as described with reference to FIG. 9b).

According to a third option OPT3, the first computation resource CR1 may select one of the RTL code belonging to the first to third sub-program codes SPC1 to SPC3 and the operating system program OS PGM and may perform a task, and the first computation resource CR1 may support multi-threading of the operating system program OS PGM (as described with reference to FIG. 9C).

According to a fourth option OPT4, the first computation resource CR1 may select one of the RTL code belonging to the first to third sub-program codes SPC1 to SPC3 and the operating system program OS PGM and may perform a task, and the first computation resource CR1 may support multi-threading of the operating system program OS PGM and the accelerated machine learning operation (e.g., as described with reference to FIG. 9D).

The first program code PG1 according to an example embodiment of the inventive concepts may include codes that cause the first computation resource CR1 to perform a task based on the first to fourth options OPT1 to OPT4.

Figure 11:
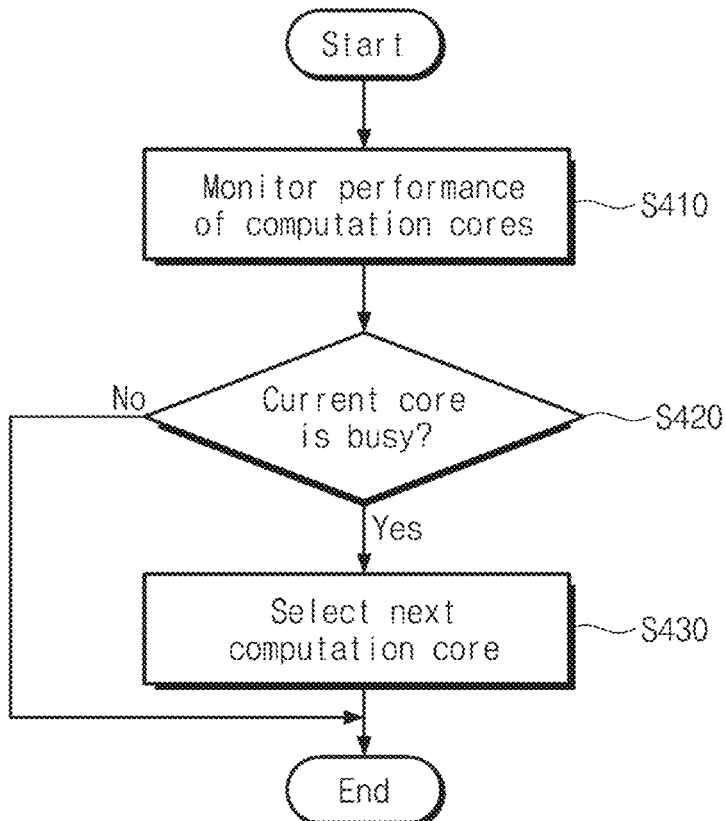
FIG. 11 illustrates an example embodiment in which a first computation resource performs load management.

FIG. 11 illustrates an example embodiment in which the first computation resource CR1 performs load management. Referring to FIGS. 1 and 11, in operation S410, the first computation resource CR1 may monitor performance of computation cores. For example, as described with reference to FIGS. 9A to 9D, the computation cores may include an FPGA, an ARM processor, an eFPGA, and an ARM processor including a machine learning (ML) accelerator.

In operation S420, the first computation resource CR1 may determine whether a current core is busy. For example, the first computation resource CR1 may determine whether a core (e.g., a current core) that is performing a task is in a busy state, by executing a sub-program code.

For example, when a usage rate of the computing power of the current core increases as much as a first threshold value or more compared to when the task starts to be performed, the first computation resource CR1 may determine that the current core is in a busy state. As another example, when a share of a sub-program code of the computing power of the current core decreases as much as a second threshold value or more compared to when the task starts to be performed, the first computation resource CR1 may determine that the current core is in a busy state.

When the current core is not in a busy state, the first computation resource CR1 may allow the current core to continue to perform the task and may end load management.

When the current core is in a busy state, in operation S430, the first computation resource CR1 may select a next computation core. For example, the first computation resource CR1 may select a computation core having the lowest load. The first computation resource CR1 may select a computation core having the shortest execution time of the test code from among computation cores having a load lower than a third threshold value. The first computation resource CR1 may load the sub-program code to the selected next computation core, and the selected next computation core may perform a task by executing the loaded sub-program code.

In an example embodiment, when the current core performs the task based on load balancing with any other core(s), the first computation resource CR1 may again adjust load balancing of the current core and the other core(s) based on a result of monitoring the performance. For example, the first computation resource CR1 may reduce the load of the current core and may increase the load of the other core(s).

Figure 12:
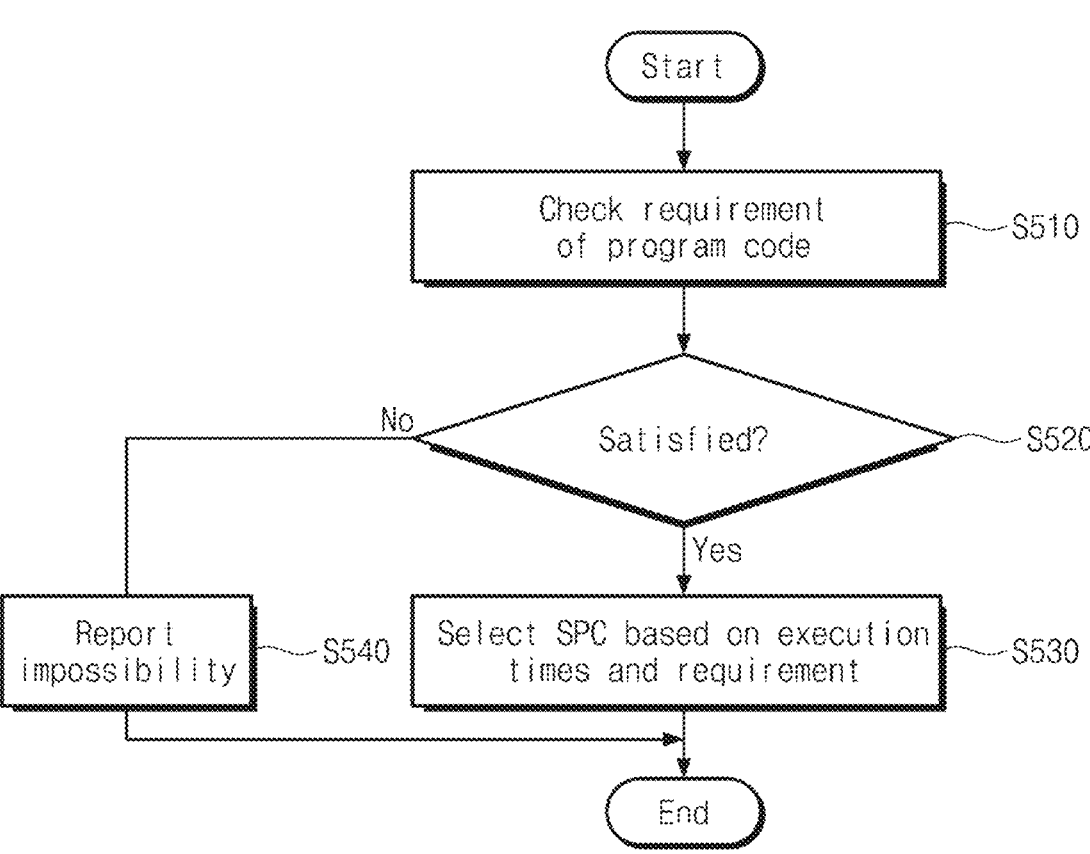
FIG. 12 illustrates an example embodiment in which a first computation resource checks a requirement of a combined program code.

FIG. 12 illustrates an example embodiment in which the first computation resource CR1 checks a requirement of a combined program code. Referring to FIGS. 1, 5, and 12, in operation S510, the first computation resource CR1 may check a requirement of a program code. For example, the function list of the first micro code MC1 corresponding to the first program code PG1 may further include codes (e.g., check codes) for checking a requirement. The first computation resource CR1 may determine whether the first computation resource CR1 satisfies the requirement, by executing the check codes.

When it is determined in operation S520 that the requirement is satisfied, in operation S530, the first computation resource CR1 may select the sub-program code SPC based on the requirement and the execution time of the first computation resource CR1. For example, the first computation resource CR1 may select a sub-program code corresponding to a sub-program test code having the shortest execution time from among sub-program test codes satisfying the requirement. When the number of sub-program test codes satisfying the requirement is "1", the first computation resource CR1 may select the sub-program code satisfying the requirement without executing (e.g., omitting the execution of) the sub-program test code.

When it is determined in operation S520 that the requirement is not satisfied, in operation S540, the first computation resource CR1 may report impossibility of the execution of the first program code PG1 to the processor 110. The report of the first computation resource CR1 may be used as grounds for updating the first program code PG1 and the combined program code so as to be executable in the first computation resource CR1.

Figure 13:
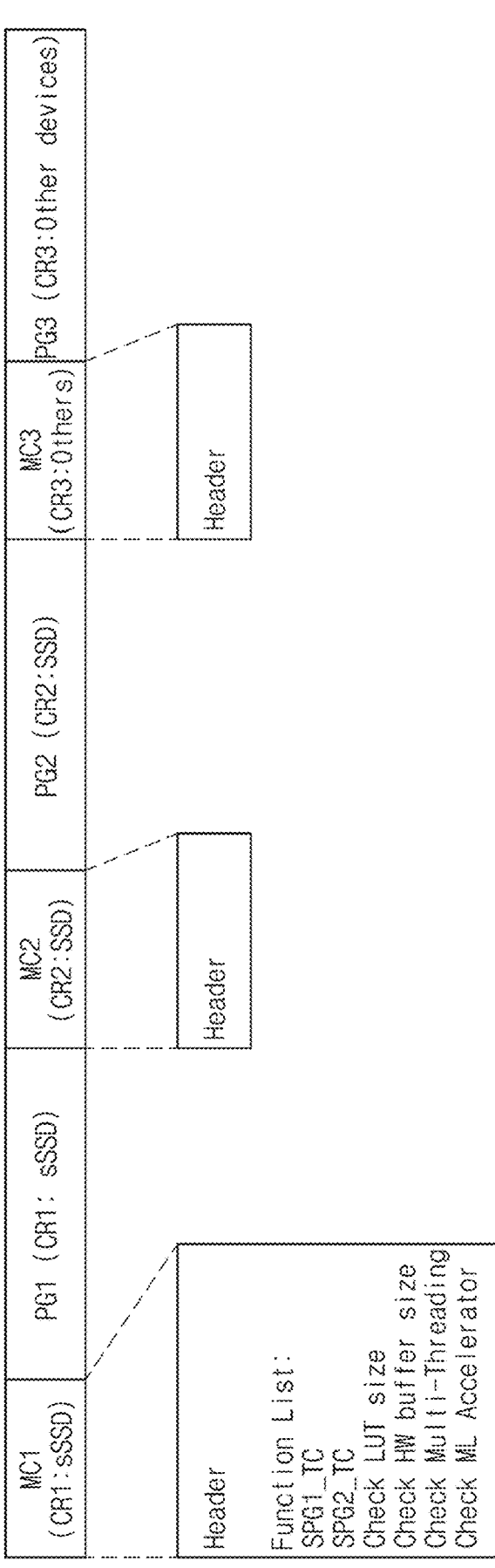
FIG. 13 illustrates an example embodiment of a combined program code further including check codes.

FIG. 13 illustrates an example embodiment of a combined program code further including check codes. Referring to FIGS. 1 and 13, the function list of the first micro code MC1 corresponding to the first computation resource CR1 may further include check codes.

One of the check codes may be used to check a look-up-table (LUT) size. The LUT size may correspond to an amount of a resource which may be desirable or necessary for the FPGA or eFPGA to perform computations. As the LUT size decreases, the computing power of the FPGA or eFPGA may decrease. As the LUT size increases, the computing power of the FPGA or eFPGA may increase. The first computation resource CR1 may check whether the LUT size of the FPGA or eFPGA included in the first computation resource CR1 satisfies the requirement of the first program code PG1, by executing the check code.

Another of the check codes may be used to check a hardware (HW) buffer size. The hardware buffer size may be a size of a hardware buffer capable of being allocated for the first computation resource CR1 to execute the first program code PG1 or a size of a hardware buffer of the first computation resource CR1. When the hardware buffer size increases, the computing power of the first computation resource CR1 may increase. When the hardware buffer size decrease, the computing power of the first computation resource CR1 may decrease. The first computation resource CR1 may check whether the hardware buffer size of the first computation resource CR1 satisfies the requirement of the first program code PG1, by executing the check code.

Another of the check codes may be used to check multi-threading. When multi-threading is possible in the first computation resource CR1, the computing power of the first computation resource CR1 may increase, and codes or routines supporting the multi-threading may be executable in the first computation resource CR1. When multi-threading is impossible (or not practical) in the first computation resource CR1, the computing power of the first computation resource CR1 may decrease, and codes or routines that may desire or require the multi-threading may be incapable of being executable in the first computation resource CR1. The first computation resource CR1 may determine whether the first computation resource CR1 satisfies the requirement of the multi-threading, by executing the check code.

The other of the check codes may be used to check a machine learning (ML) accelerator. When the machine learning accelerator is provided in the first computation resource CR1, the computing power of the first computation resource CR1 may increase, and codes or routines associated with the machine learning ML may be executable in the first computation resource CR1. When the machine learning accelerator is not provided in the first computation resource CR1, the computing power of the first computation resource CR1 may decrease, and codes or routines that may desire or require the machine learning ML may be incapable of being executable in the first computation resource CR1. The first computation resource CR1 may determine whether the first computation resource CR1 satisfies the requirement of the machine learning accelerator, by executing the check code.

FIG. 14 illustrates an additional example of four options in which the first computation resource CR1 performs a task. The first to fourth options OPT1 to OPT4 of FIG. 14 may further include a requirement (REQ) applied to each of the first to fourth options OPT1 to OPT4, in addition to the first to fourth options OPT1 to OPT4 of FIG. 10.

Referring to FIGS. 1, 13, and 14, the first computation resource CR1 of the first option OPT1 may correspond to the 1a-th computation resource CR1a of FIG. 9A. The first computation resource CR1 of the first option OPT1 may execute the RTL code and the HIL code that are based on the FPGA. In the first option OPT1, the LUT size of the FPGA may be applied as the requirement.

The first computation resource CR1 may check whether the LUT size of the FPGA of the first computation resource CR1 satisfies the requirement of the first program code PG1 (e.g., whether the LUT size is larger than the requirement), by executing the check code.

The first computation resource CR1 of the second option OPT2 may correspond to the 1b-th computation resource CR1b of FIG. 9B. The first computation resource CR1 of the second option OPT2 may execute the RTL code and the HIL code, which are based on the FPGA, and the operating system program OS PGM of the ARM processor. In the second option OPT2, the LUT size of the FPGA may be applied as the requirement. Also, in the second option OPT2, multi-threading (MT) and a machine learning (ML) accelerator of the ARM processor may be applied as the requirement.

The first computation resource CR1 may check whether the LUT size of the FPGA of the first computation resource CR1 satisfies the requirement of the first program code PG1 (e.g., whether the LUT size is larger than the requirement), by executing the check code. Also, the first computation resource CR1 may check whether the ARM processor of the first computation resource CR1 satisfies the requirement of the first program code PG1 (e.g., whether the ARM processor supports the multi-threading or supports the machine learning accelerator), by executing the check code.

The first computation resource CR1 of the third option OPT3 may correspond to the 1c-th computation resource CR1c of FIG. 9C. The first computation resource CR1 of the third option OPT3 may execute the eFPGA-based RTL code and the operating system program OS PGM of the ARM processor. The two ARM processors may support multi-threading (MT). In the third option OPT3, the LUT size of the eFPGA may be applied as the requirement. Also, in the third option OPT3, the machine learning (ML) accelerator of the ARM processor may be applied as the requirement.

The first computation resource CR1 may check whether the LUT size of the eFPGA of the first computation resource CR1 satisfies the requirement of the first program code PG1 (e.g., whether the LUT size is larger than the requirement), by executing the check code. Also, the first computation resource CR1 may check whether the ARM processor of the first computation resource CR1 satisfies the requirement of the first program code PG1 (e.g., whether the ARM processor includes the machine learning accelerator), by executing the check code.

The first computation resource CR1 of the fourth option OPT4 may correspond to the 1d-th computation resource CR1*d* of FIG. 9D. The first computation resource CR1 of the fourth option OPT4 may execute the eFPGA-based RTL code and the operating system program OS PGM of the ARM processor. The two ARM processors may support multi-threading (MT). One of the two ARM processors may include the machine learning accelerator. In the fourth option OPT4, the LUT size of the eFPGA may be applied as the requirement.

The first computation resource CR1 may check whether the LUT size of the eFPGA of the first computation resource CR1 satisfies the requirement of the first program code PG1 (e.g., whether the LUT size is larger than the requirement), by executing the check code.

In the first to fourth options OPT1 to OPT4, the hardware (HW) buffer size of the first computation resource CR1 may be applied as the requirement in common. The first computation resource CR1 may check whether the hardware buffer size of the first computation resource CR1 satisfies the requirement of the first program code PG1 (e.g., whether the hardware buffer size is larger than the requirement), by executing the check code.

Examples of the requirements are described with reference to FIGS. 13 and 14, but requirements for the first computation resource CR1 are not limited to those described with reference to FIGS. 13 and 14.

As described above, according to some example embodiments of the inventive concepts, computation resources included in the electronic device 100 are jointly managed by using a combined program code. Accordingly, it may be easy to program and manage the computation resources, and a computing power, power consumption, and a time necessary for programming and managing the computation resources of the electronic device 100 may be reduced.

Also, according to some example embodiments of the inventive concepts, the computation devices may interact based on the CXL. As the computation resources are jointly managed by using a combined program code, it may be easy to cause the computation resources to co-work a common task.

In the above example embodiments, components according to example embodiments of the inventive concepts are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to some example embodiments of the inventive concepts, smart peripheral devices are programmed by the same single program code. Accordingly, an overhead that at least one processor programs smart peripheral devices is reduced. Also, according to embodiments of the present disclosure, smart peripheral devices may interact through a compute express link (CXL). Accordingly, the smart peripheral devices that process a task through interactions are provided.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While the inventive concepts have been described with reference to some example embodiments thereof, it will be apparent to those of ordinary skill in the art that various changes and modifications may be made thereto without departing from the scope of the inventive concepts.

What is claimed is:

1. An electronic device comprising:
a processor;
an interface bus connected to the processor; and
a plurality of compute express link (CXL) devices connected to the interface bus, the plurality of CXL devices including two or more different types of CXL devices,
wherein the processor is configured to output a combined program code to the interface bus, the combined program code including a plurality of program codes,
wherein each CXL device of the plurality of CXL devices is configured to receive the combined program code from the interface bus, and
wherein each CXL device of the plurality of CXL devices is configured to store one of the plurality of program codes of the combined program code which corresponds to a type of each of the CXL devices of the plurality of CXL devices, in order to change an operation of each of the CXL devices of the plurality of CXL devices according to the corresponding stored one of the plurality of program codes.

2. The electronic device of claim 1, wherein each of the plurality of program codes corresponds to one of the two or more different types of the plurality of CXL devices.

3. The electronic device of claim 2, wherein the combined program code further includes a plurality of micro codes corresponding to the plurality of program codes.

4. The electronic device of claim 3, wherein each micro code of the plurality of micro codes, when executed by the plurality of CXL devices, is configured to return information about the type of CXL device corresponding to a program code following each of the micro codes of the plurality of micro codes.

5. The electronic device of claim 4, wherein each of the plurality of CXL devices is configured to store the program code following one of the plurality of micro codes that returns the information identifying a CXL device type which corresponds to the CXL device.

6. The electronic device of claim 1, wherein, as each of the plurality of CXL devices executes its stored one of the plurality of program codes, the plurality of CXL devices are configured to co-work a task designated by the combined program code.

7. The electronic device of claim 1, wherein the two or more different types of CXL devices include a smart solid state drive (SSD), a CXL SSD, and at least one device other than the smart SSD and the CXL SSD.

8. The electronic device of claim 7, wherein one of the plurality of program codes which corresponds to the smart SSD includes two or more different sub-program codes.

9. The electronic device of claim 8, wherein a micro code corresponding to the smart SSD includes test codes corresponding to the two or more different sub-program codes.

10. The electronic device of claim 1, wherein the interface bus includes a flex interface bus configured to support a peripheral component interconnect express (PCIe) and a CXL.

11. An electronic device comprising:

a nonvolatile memory device; and a controller configured to communicate with an external interface bus and to control the nonvolatile memory device, wherein the controller is configured to receive a combined program code from the external interface bus, the combined program code including a plurality of program codes and including a plurality of micro codes corresponding to the plurality of program codes, each micro code of the plurality of micro codes corresponding to a type of the electronic device, wherein the controller is configured to store a corresponding program code of the plurality of program codes of the combined program code, in order to change an operation of the controller according to the corresponding stored program code of the plurality of program codes, and wherein the controller is configured to sequentially execute the plurality of micro codes to identify the corresponding program code.

12. The electronic device of claim 11, wherein, the controller is configured to sequentially execute the plurality of micro codes until a result of executing a specific micro code of the plurality of micro codes identifies the type of the electronic device of the corresponding program code, and the controller is configured to store the corresponding program code of the plurality of program codes which corresponds to the specific micro code of the plurality of micro codes, the specific micro code corresponding to the type of the electronic device.

13. The electronic device of claim 12, wherein, a program code corresponding to the specific micro code of the plurality of micro codes includes sub-program codes of two or more different types, and the specific micro code of the plurality of micro codes which corresponds to the type of the electronic device includes test codes corresponding to the sub-program codes of the two or more different types.

14. The electronic device of claim 13, further comprising:

at least two computation cores having different types, wherein the at least two computation cores are configured to execute corresponding test codes of the specific micro code of the plurality of micro codes which corresponds to the type of the electronic device.

15. The electronic device of claim 14, wherein one of the at least two computation cores having a shortest execution time of a test code of the corresponding test codes is configured to execute a corresponding sub-program code of the sub-program codes.

16. The electronic device of claim 13, wherein the sub-program codes include a register-transfer level (RTL) code, a hardware-in-the-loop (HIL) code, and an internal operating system (OS) program.

17. The electronic device of claim 13, wherein, the specific micro code of the plurality of micro codes which corresponds to the type of the electronic device further includes at least one requirement check code, and the controller is configured to further check whether the sub-program codes are executable, by executing the at least one requirement check code.

18. The electronic device of claim 17, wherein the at least one requirement check code checks at least one of:

a look-up-table (LUT) size of a field programmable gate array (FPGA) or an embedded FPGA (eFPGA);

a hardware buffer size;

a multi-threading capability; and a machine learning accelerator.

19. The electronic device of claim 11, wherein, the controller is configured to communicate with the external interface bus through a peripheral component interconnect express (PCIe) and a compute express link (CXL), and the corresponding program code of the plurality of program codes includes a code interacting with an external device based on the CXL.

20. An operating method of an electronic device which includes a nonvolatile memory device and a controller, the operating method comprising:

receiving, at the controller, a combined program code from an external interface bus, the combined program code including a plurality of micro codes and a plurality of program codes corresponding to the plurality of micro codes, each micro code of the plurality of micro codes corresponding to a type of the electronic device;

storing, at the controller, a corresponding program code of the plurality of program codes, in order to change an operation of the controller according to the corresponding stored program code of the plurality of program codes; and identifying, at the controller, one of the plurality of program codes corresponding to the type of the electronic device by sequentially executing the plurality of micro codes.

* * * * *